July 4, 1950 A. J. WEATHERHEAD, JR 2,513,976
VALVE
Filed Feb. 2, 1946

INVENTOR.
ALBERT J. WEATHERHEAD JR.
BY
*Richey & Watts*
ATTORNEYS

Patented July 4, 1950

2,513,976

UNITED STATES PATENT OFFICE 2,513,976

VALVE

Albert John Weatherhead, Jr., Shaker Heights, Ohio, assignor to The Weatherhead Company, Cleveland, Ohio, a corporation of Ohio Application February 2, 1946, Serial No. 645,027

1 Claim. (Cl. 251—27)

This invention relates to a valve, more particularly to a shutoff valve of the type normally employed to regulate and shut off the flow of fluid manually.

Shutoff valves of the prior art have been customarily made to include a valve disc carrying a fibre or deformable washer and a metallic valve seat which is engaged by the washer when the valve is positioned to shut off the flow of fluid. Difficulty has been experienced with this type of valve because the powerful force exerted by the screw used to position the valve member has resulted in a distortion or laceration of the fibre member by the valve seat with the attendant leakage. It is an object of this invention to insure a positive and tight fluid shutoff arrangement which is not subject to objectionable wear and distortion, by providing a closure member which is not forced against a valve seat but which seals against walls of a chamber within the valve body.

In addition to the leakage troubles which arise with valves of the prior art, it has been found that the machining operation necessary to form the valve seat within the body of the valve is relatively costly. It is another object of this invention to eliminate several relatively difficult machining operations by providing a valve which can be largely manufactured by simple turning operations.

The packing or washer member in the valves of the prior art previously referred to have been customarily held in place in the valve member by means of a screw or similar fastening device. It has been found that this screw sometimes drops out and falls into the valve. Often when changing a washer member it is found that the screw, if frozen in place, and the head must often be destroyed before this screw can be removed. Furthermore, the washer member of prior valves has a tendency to be so tightly wedged in place by the pressure of the valve stem screw, that removal by anyone but a skilled mechanic is oftentimes difficult. It is an object of this invention to eliminate these difficulties encountered with sealing members of the prior valves by providing a valve whose sealing member is readily replaced and which requires no fastening screws or other special retaining means.

Other objects and advantages of the present invention will be apparent to those skilled in the art as the following description proceeds of a preferred embodiment.

Figure 1:
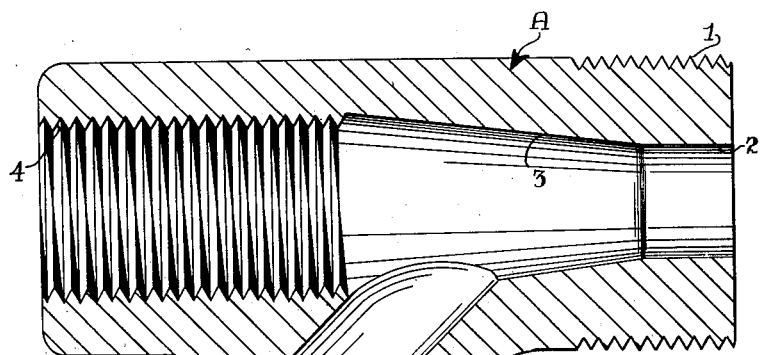
Fig. 1 is a cross-sectional view of the valve body of the preferred form of valve made according to this invention.

Referring to Fig. 1, it can be seen that the valve body A has an externally threaded portion 1 which is for attachment to the inlet for supply of fluid. The valve body has a longitudinal bore which includes a generally cylindrical portion 2, a conical portion 3 the smaller end of which merges with said cylindrical portion, and an internally threaded portion 4 adapted to receive the valve member. The valve body A also includes an outlet nipple 5 which has formed therein an outlet passageway 6 which communicates with conical chamber 3 adjacent its larger end.

Figure 2:
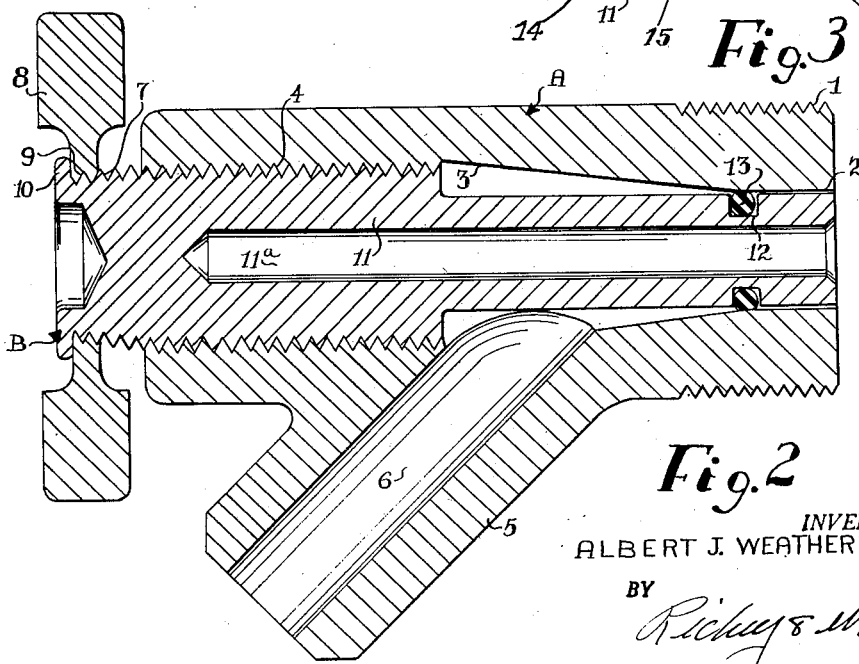
Fig. 2 is a cross-section of the complete valve.

Fig. 2, which is a cross-section of an assembled valve, shows valve body A into which is threaded a movable valve member B. The valve member B has external threads 7 which are for cooperation with internal threads 4 of the valve body in order that the valve member B may be positioned by turning the handle. A handle 8 or other convenient means to rotate the valve member B is provided. In the form shown in Fig. 2, threads 7 have been reduced in pitch diameter at the part 9 to which the handle is to be attached and the member has been headed over as at 10 to securely locate and retain the handle 8. Valve member B also includes an axially extending portion 11 of reduced diameter which may be drilled as at 11a to decrease the weight of the member if so desired. Portion 11 of valve member B has an external groove 12 formed therein which receives a sealing member 13. The groove 12 has a side wall portion 14 remote from the inlet, a bottom wall 15 and a side wall portion 16 disposed toward the inlet. The wall portion 14 of the groove, the adjacent wall portion of the body bore, and the sealing ring 13 define an annular space 17 into which the adjacent part of the O-ring may be deformed by action of fluid pressure on the side 18 of the O-ring disposed toward the fluid inlet.

Figure 3:
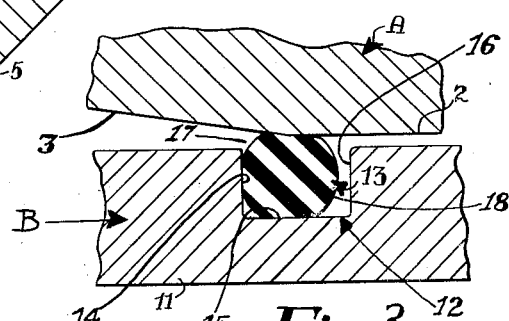
Fig. 3 is an enlarged cross-sectional view of the sealing member.

Although it is contemplated that any conventional annular sealing member can be used, Fig. 3 shows an enlarged view of one successful form of sealing arrangement. It can be seen that non-metallic sealing ring 13 commonly called an "O-ring" is retained in the groove 12 portion 11 of the valve member. The groove 12 is so arranged with respect to the valve member B in the valve body A that when the valve member B has been rotated to its shutoff position, as shown in Fig. 2, the sealing ring 13 comes to rest adjacent a junction of the conical bore 3 and the cylindrical bore 29, as best seen in Fig. 3. The action of inlet pressure on the side 18 of the sealing ring is such that it is forced against the bottom wall 15 and side wall 16 of groove 12 and against the wall of the body portion A of the valve as the portion of the ring adjacent annular space 17 is deformed into said space to partially fill it, as shown in Fig. 3, which action results in a dependable and fluid-tight seal.

Referring to Figs. 2 and 3, it will be noted that as the handle 8 is turned to open the valve, the sealing ring 13 is moved axially away from the junction of the cylindrical portion 2 and the conical bore 3, and since the conical bore 3 gradually enlarges in diameter in the direction toward which the sealing member 13 is being moved, the sealing member 13 is gradually disengaged from the wall of valve body A and pressure upon it is gradually released. This arrangement prevents damage to the sealing member. Likewise, as the valve is closed or shut off, the gradual reduction in diameter of the conical portion 3 effects the positive closing or shutting off of the fluid without damage to the sealing ring 13.

Having completed the detailed description of the shutoff valve of my invention, it can be seen how a positive shutoff of fluid can be attained without resorting to the conventional type of valve disc and valve seat. It can also be seen that the valve member B can be readily removed and the sealing ring 13 can be easily replaced without use of tools and without the need for special fastening devices.

Those skilled in the art will appreciate that various modifications in the designed details of my valve may be made without departing from the spirit of the invention; for example, the attaching threads 1 for the inlet supply merely represent one form of attaching arrangement and can be replaced by any suitable attaching means without modifying the invention. Likewise, the shape of the passageway 2 can be modified without affecting the operation of the valve and conical bore 3 need not be conical the only thing critical being that its diameter gradually enlarges as shown in the drawing. The angle in which the outlet nipple 6 forms with the valve body axis is not critical in this invention, nor is the method of attaching the handle to the valve body B. The extension 11 of valve body B need not be completely cylindrical throughout its length, the critical factor being that it must be sufficiently smaller in diameter than the internal bore 3 to provide a sliding fit and hence to permit fluid which flows past the sealing ring 13 to communicate with the outlet passageway 6. These and other modifications may be made without departing from the spirit of the invention as defined in the appended claim.

Having thus described the present invention so that others skilled in the art may be able to understand and practice the same, I state that what I desire to secure by Letters Patent is defined in what is claimed.

What is claimed is:

A valve comprising a valve body, a bore in said body, one portion of said bore being a cylindrical fluid passageway and another portion of said bore having a generally conical surface the smaller diameter end of which forms a continuation of said cylindrical bore portion, a second fluid passageway formed in said body and connecting said bore at an appreciable distance from the smaller end of said conical bore portion, one of said passageways forming an inlet for fluid under pressure and the other forming an outlet, a valve member movable in the bore of said valve body, said valve member having an axially extending cylindrical portion of slightly smaller diameter than the diameter of said cylindrical passage and arranged to telescope therewith, and means forming an annular groove in the cylindrical portion of said valve member said member being positionable to dispose the groove adjacent the junction of said small diameter conical bore portion and the cylindrical bore portion, and an annular rubber-like sealing ring carried in the groove of said valve member, said valve member being movable to a closed position to bring said sealing ring within said cylindrical passage, said sealing ring projecting out of said groove to engage said body bore and being initially radially deformed between the wall of said body bore and the bottom wall of said groove with the valve in said closed position, a side wall portion of said groove remote from the inlet, the wall portion of said body bore adjacent said side wall portion of the groove, and said sealing ring defining an annular space into which the adjacent part of said sealing ring may be urged by fluid under pressure acting on the side of said ring disposed toward the inlet.

ALBERT JOHN WEATHERHEAD, Jr.

REFERENCES CITED

The following references are of record in the file of this patent:

UNITED STATES PATENTS

| Number | Name | Date |
|---|---|---|
| 394,475 | Dwyer | Dec. 11, 1888 |
| 941,760 | Cordley | Nov. 30, 1909 |

FOREIGN PATENTS

| Number | Country | Date |
|---|---|---|
| 9,164 | Great Britain | June 22, 1915 |
| 40,549 | Germany | Dec. 11, 1886 |
| 835,379 | France | Dec. 20, 1938 |